(12) United States Patent
Benco et al.

(10) Patent No.: US 7,221,931 B2
(45) Date of Patent: May 22, 2007

(54) NETWORK SUPPORT FOR ELECTRONIC PASSPORTS

(75) Inventors: David S. Benco, Winfield, IL (US);
Sanjeev Mahajan, Naperville, IL (US);
Baoling S. Sheen, Naperville, IL (US);
Sandra L. True, St. Charles, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 23 days.

(21) Appl. No.: 11/112,247

(22) Filed: Apr. 22, 2005

(65) Prior Publication Data

US 2006/0238607 A1    Oct. 26, 2006

(51) Int. Cl.
*H04N 7/14* (2006.01)
(52) U.S. Cl. ............. 455/410; 455/411; 348/14.01
(58) Field of Classification Search ........... 455/410, 455/411, 412.1, 550.1, 445; 707/104.1; 713/172, 713/186, 201; 382/115–119; 726/3; 348/211.99, 348/14.01
See application file for complete search history.

(56) References Cited

U.S. PATENT DOCUMENTS

| | | | | |
|---|---|---|---|---|
| 6,104,922 A | * | 8/2000 | Baumann | 455/410 |
| 2003/0229506 A1 | * | 12/2003 | Scott et al. | 705/1 |
| 2005/0039014 A1 | * | 2/2005 | Sajkowsky | 713/172 |
| 2005/0083413 A1 | * | 4/2005 | Reed et al. | 348/211.99 |

* cited by examiner

*Primary Examiner*—George Eng
*Assistant Examiner*—Sam Bhattacharya

(57) ABSTRACT

An apparatus in one example has: a telecommunications network having at least an image recognition and comparison module and an scanned image database; a mobile terminal having image scan functionality and image capture functionality, the mobile terminal operative coupled to the telecommunications network; and a database system operatively coupled to the telecommunications network, the database system having at least an image database.

19 Claims, 3 Drawing Sheets

NETWORK SUPPORT FOR ELECTRONIC PASSPORTS

TECHNICAL FIELD

The invention relates generally to telecommunications and more particularly to a telecommunication system that has roaming for mobile terminals.

BACKGROUND

Remote retinal scan identifier and video imaging apparatus are known. One such apparatus may have a laser, which may be any of the well known lasers including solid state lasers, such as vertical cavity surface emitting lasers, diode lasers, diode-pumped lasers, etc., which supplies a coherent light beam to a modulator. The modulator, when activated, impresses video information onto the light beam generally by modulating the intensity of the light beam as, for example, by providing changes in the power level of laser. Depending upon the application, the modulation could be as simple as turning laser off and on, which essentially translates into a digital system. Acousto-optic modulators are one of the preferred modulators for most applications, but other techniques, such as electro-optics and mechanical are completely feasible. The modulator may operate to allow direct passage (unmodulated) of the light beam from the laser when the modulator is deactivated.

The modulated/unmodulated light beam from modulator is directed to a deflection system. A lens system may be used to focus the light beam from the deflection system into the retina of a person's eye. The focal length of the lens system is chosen so that the focal point of the scanning optical system is at the pupil of the eye, and the focal point of the beam optical system is at the retina of the eye. The purpose of the deflection system is to scan the modulated/unmodulated light beam on the retina of the eye in a regular pattern, such as a rastor. There are many possible configurations for the deflection system and the lens system.

Passport technology dates back to the early 1900's. Passports serve 2 purposes: to identify the traveler, and to provide a record of travel. The current methodology involves submitting duplicate photographs to the passport office, one of which is physically pasted to the passport's inside cover, the second of which is scanned into the immigration (INS) database. When a traveler enters and/or leaves a country, the immigration officer compares the photograph in the database with the person standing before him to make a positive identification. If the person and the database photo match, the immigration officer physically stamps a dated entry onto a random page of the passport.

Existing passport technology suffers from the following drawbacks: (1) passport technology is paper based, subject to physical loss, theft, damage, etc.; (2) there is no convenient way to update the photograph, so passports expire after a maximum of 10 years for adults, and sooner for children; (3) it is difficult to re-trace a person's travels by looking at randomly located stamped entries in a small booklet.

Thus there is a need: (1) to be able to electronically update the photograph on demand, because a person's physical appearance can change over time due to facial hair, hair style/color, surgery, weight gain/loss, etc.; (2) for an electronic version of the passport to provide an easily readable and searchable travel log; (3) to be able to issue the passport upon demand (to avoid problems of loss, theft, damage as forgotten passports and thus improve security).

SUMMARY

The invention in one implementation encompasses an apparatus. The apparatus comprises a telecommunications network having at least an image recognition and comparison module and a scanned image database; a mobile terminal having image scan functionality and image capture functionality, the mobile terminal operatively coupled to the telecommunications network; and a database system operatively coupled to the telecommunications network, the database system having at least an image database.

The invention in a further implementation encompasses a method. The method comprises establishing communication between a mobile terminal and a database system via a telecommunications network; determining if the mobile terminal is subscribed to a secure identity feature; prompting for entry of an identifier at the mobile terminal, when the mobile terminal is subscribed to the secure identity feature; instructing, in response to entry of the identifier, the mobile terminal to perform a retinal scan and a facial image capture; sending the retinal scan and the facial image from the mobile terminal to the telecommunications network; comparing, in the telecommunications network, the received retinal scan to stored retinal scans to determine a match; uploading the facial image to the database system when the received retinal scan matches a stored retinal scan; and dropping the communication with the mobile terminal when the received retinal scan does not match any of the stored retinal scans.

Another implementation of the invention encompasses a method. The method comprises: establishing communication between a mobile terminal and a database system via a telecommunications network; determining if the mobile terminal is subscribed to a secure identity feature; prompting for entry of an identifier at the mobile terminal, when the mobile terminal is subscribed to the secure identity feature; instructing, in response to entry of the identifier, the mobile terminal to perform a retinal scan; sending the retinal scan from the mobile terminal to the telecommunications network; comparing, in the telecommunications network, the received retinal scan to stored retinal scans to determine a match; downloading a facial image associated with the received retinal scan from the database system when the received retinal scan matches a stored retinal scan; and dropping the communication with the mobile terminal when the received retinal scan does not match any of the stored retinal scans.

DESCRIPTION OF THE DRAWINGS

Features of exemplary implementations of the invention will become apparent from the description, the claims, and the accompanying drawings in which:

DETAILED DESCRIPTION

The present apparatus and method provides for a network to enable usage of electronic passports, as a convenience for travelers, for improved security, and as a cost-saving measure for governments and individuals. More specifically, the methodology of the present apparatus and method is for the network to authenticate a mobile user's identity via retinal scan by a mobile terminal.

The network may also capture and size a facial image of the individual through the mobile terminal. The facial image may be uploaded to the INS database by the network. Furthermore, the network may securely request the INS database photo to be displayed on the mobile terminal (passport on demand).

Figure 1:
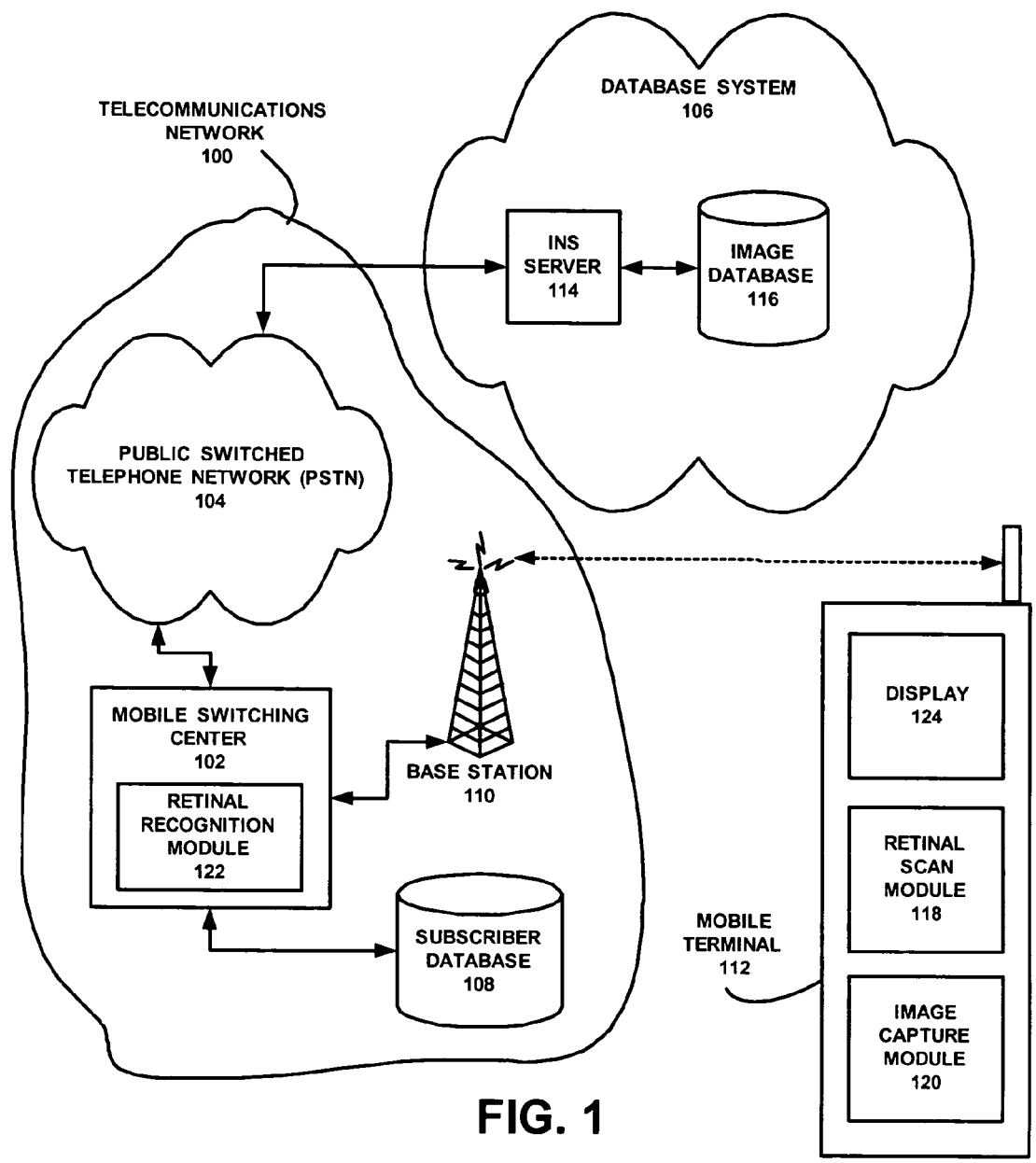
FIG. 1 is a representation of one implementation of an apparatus that provides network support for electronic passports and traveler-requested updates of a photo stored in an INS (Immigration and Naturalization Services) database.

FIG. 1 is a representation of one implementation of an apparatus that provides network support for electronic passports and traveler-requested updates of a photo stored in an INS (Immigration and Naturalization Services) database.

A telecommunications network 100 may have a mobile switching center (MSC) 102. The network 100 may be, or may be part of, one or more of a telephone network, a local area network ("LAN"), the Internet, and a wireless network. In the depicted embodiment, a public switched telephone network (PSTN) 104 may be connected to the MSC 102. The PSTN 104 routes calls to and from a mobile terminal 112 through the MSC 102. The PSTN 104 also routes calls from and to a database system 106. The MSC 102 may also be connected to at least one base station (BS) 110. The base station 110 communicates with the mobile terminal 112 in its service area using a subscriber database 108. The PSTN 104 generally may be implemented as the worldwide voice telephone network accessible to all those with telephones and access privileges (e.g., AT&T long distance network).

The database system 106 in one example may have an INS server 114 that is operatively coupled to an image database 116, such as a passport database. The passport database may contain information such as passport photos and time stamped travel log information. Other information may be contained in the image database 116. Also, the present apparatus and method may be utilized for systems, other than those that involve passports.

In one exemplary embodiment the mobile terminal 112 may take retinal scans and facial photos of mobile terminal users. The retinal scans may be stored in the mobile subscriber database 108 or in a separate database, and the facial photos may be stored in the image database 116.

Historically, camera phones have been plagued with very low (i.e., less than 1 megapixel) resolution. However, the resolution of camera phones is rising dramatically, with several manufacturers offering 2–3 megapixels and Samsung having recently introduced the first 7 megapixel model, more powerful than all but the high-end digital cameras on the market today. Such resolution is more than sufficient to capture a detailed facial image to serve as a passport photo.

Retinal scanning is one of the best biometric performers for security. It has a nearly zero percent false accept rate, small data template, and quick identify confirmations. Retinal Scan technology maps the capillary pattern of the retina, a thin nerve on the back of the eye. The subject is required to keep his or her head and eye motionless for a few seconds within a half-inch of the camera lens, focusing on a small point of green light emitted by the camera. Infrared light is used to capture the retinal image because blood vessels on the retina absorb the light faster than the surrounding eye tissue. The video camera then captures the retinal pattern and translates it into data that is 35 bytes in size. This 35-byte packet is then uploaded to the MSC and compared with the 35-byte stored retinal scan. Again, a 7 megapixel camera phone has more than sufficient resolution to accomplish this pattern capture. A promising new technology, Iris Scanning, is similarly suitable for implementation via camera phone image capture and upload.

The mobile terminal 112 may be a cell phone that has image scan functionality and image capture functionality. The image scan functionality may be implemented by a retinal scan module 118 and the image capture functionality may be implemented by a camera module 120 in the cell phone. The mobile terminal 112 sends the retinal scan and the facial image to the telecommunications system. The MSC 102 may have a retinal recognition module 122 that compares a received retinal scan to the stored retinal scans. When a match occurs between the received retinal scan and one of the stored retinal scans, the retinal recognition module 122 effects uploading of the associated received facial image to the image database 116 in the database system 106. The passport photo (facial image) and time stamped travel log information may be at least one of outputted in a hardcopy form as a passport and displayed on a display 124 of the mobile terminal as an electronic passport.

Figure 2:
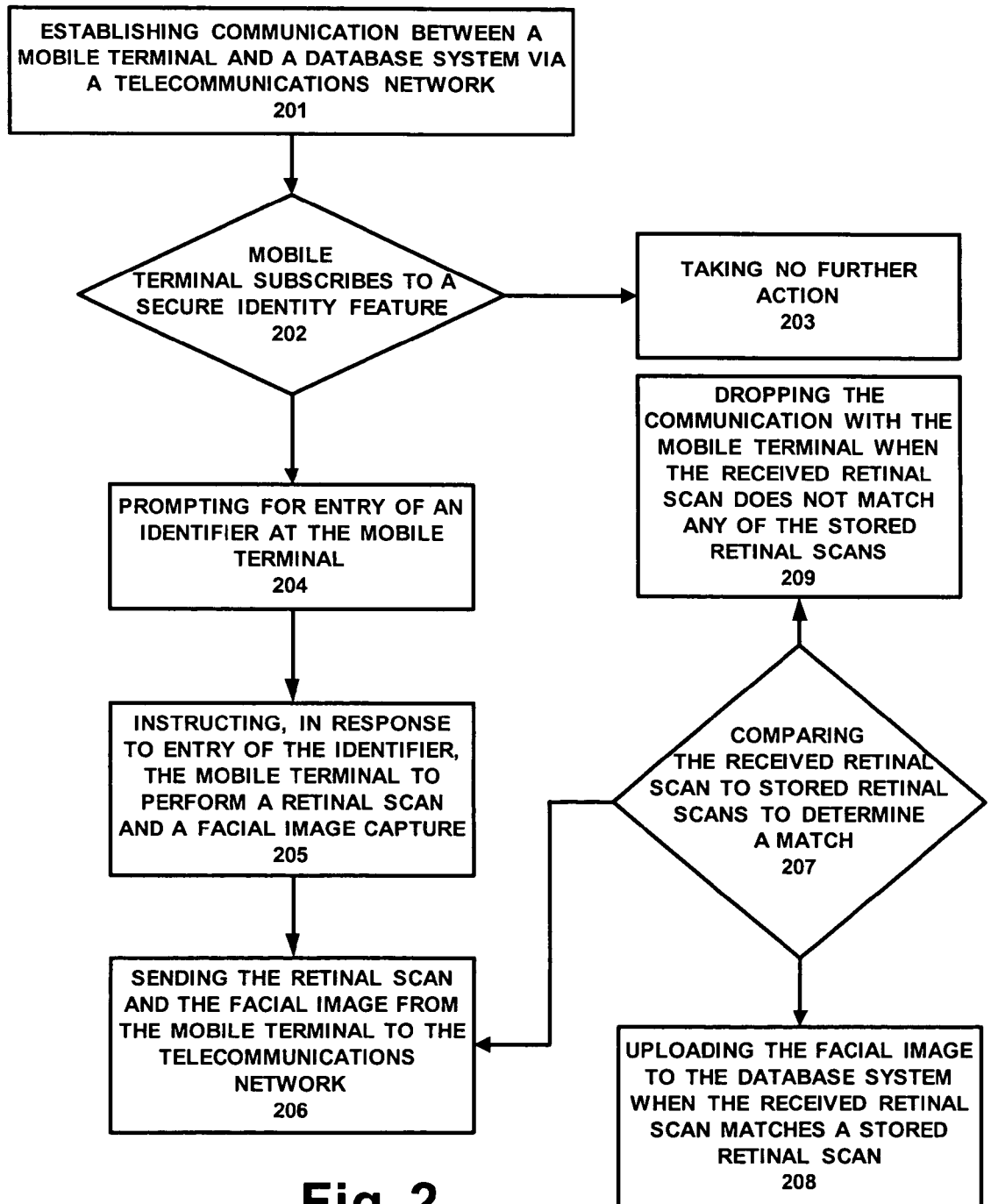
FIG. 2 is a representation of one exemplary flow diagram for updating photos for electronic passports.

FIG. 2 is a representation of one exemplary flow diagram for updating photos for electronic passports. Embodiments of the present apparatus and method provide for convenient updating of a person's passport. The method may have the steps of: establishing communication between a mobile terminal and a database system via a telecommunications network (201); determining if the mobile terminal is subscribed to a secure identity feature (202); taking no further action if the mobile terminal is not subscribed to the secure identity feature (203); prompting for entry of an identifier at the mobile terminal, when the mobile terminal is subscribed to the secure identity feature (204); instructing, in response to entry of the identifier, the mobile terminal to perform a retinal scan and a facial image capture (205); sending the retinal scan and the facial image from the mobile terminal to the telecommunications network (206); comparing, in the telecommunications network, the received retinal scan to stored retinal scans to determine a match (207); uploading the facial image to the database system when the received retinal scan matches a stored retinal scan (208); and dropping the communication with the mobile terminal when the received retinal scan does not match any of the stored retinal scans (209).

Figure 3:
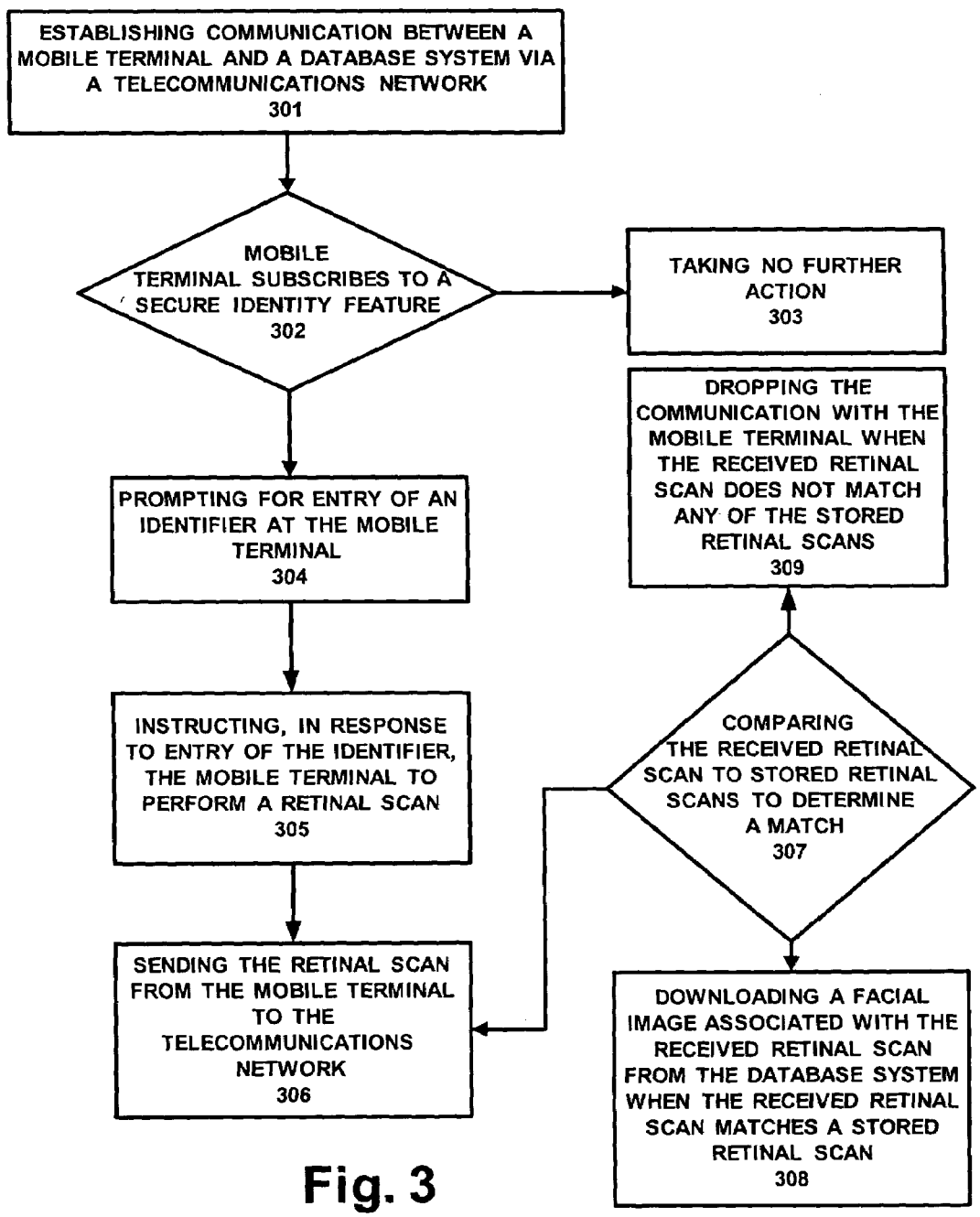
FIG. 3 is a representation of one exemplary flow diagram for downloading electronic passports.

FIG. 3 is a representation of one exemplary flow diagram for downloading electronic passports. This method may have the steps of: establishing communication between a mobile terminal and a database system via a telecommunications network (301); determining if the mobile terminal is subscribed to a secure identity feature (302); taking no further action if the mobile terminal does not subscribed to the secure identity feature (303); prompting for entry of an identifier at the mobile terminal, when the mobile terminal is subscribed to the secure identity feature (304); instructing, in response to entry of the identifier, the mobile terminal to perform a retinal scan (305); sending the retinal scan from the mobile terminal to the telecommunications network (306); comparing, in the telecommunications network, the received retinal scan to stored retinal scans to determine a match (307); downloading a facial image associated with the received retinal scan from the database system when the received retinal scan matches a stored retinal scan (308); and dropping the communication with the mobile terminal when the received retinal scan does not match any of the stored retinal scans (309).

The present apparatus in one example may comprise a plurality of components such as one or more of electronic components, hardware components, and computer software components. A number of such components may be combined or divided in the apparatus.

The present apparatus in one example may employ one or more computer-readable signal-bearing media. The computer-readable signal-bearing media may store software, firmware and/or assembly language for performing one or more portions of one or more embodiments. Examples of a computer-readable signal-bearing medium for the apparatus 100 may comprise the recordable data storage medium (subscriber database 108). The computer-readable signal-bearing medium for the apparatus 100 in one example may comprise one or more of a magnetic, electrical, optical, biological, and atomic data storage medium. For example, the computer-readable signal-bearing medium may comprise floppy disks, magnetic tapes, CD-ROMs, DVD-ROMs, hard disk drives, and electronic memory. In another example, the computer-readable signal-bearing medium may comprise a modulated carrier signal transmitted over a network comprising or coupled with the apparatus, for instance, one or more of a telephone network, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
   a telecommunications network having at least an image recognition and comparison module and an scanned image database;
   a mobile terminal having image scan functionality and image capture functionality, the mobile terminal operative coupled to the telecommunications network; and
   a database system operatively coupled to the telecommunications network, the database system having at least an image database in which is stored retinal scans and associated facial images;
   wherein the facial image is a passport photo, and wherein the passport photo and time stamped travel log information associated with the received retinal scan are downloaded from the database system when the received retinal scan matches a stored retinal scan.

2. The apparatus according to claim 1, wherein the mobile terminal is a cell phone, wherein the image scan functionality is implemented by a retinal scan module in the cell phone.

3. The apparatus according to claim 1, wherein the mobile terminal is a cell phone, and wherein the image capture functionality is implemented by a camera module in the cell phone.

4. The apparatus according to claim 1, wherein the image database is a passport database, and wherein the database system has an INS server operatively coupled to the image database.

5. The apparatus according to claim 1, wherein the telecommunications network has at least a mobile switching center operatively coupled to at least one base station and to at least one PSTN (public switched telephone network), wherein the PSTN is operatively coupled to the database system, and wherein the base station is wirelessly coupled to the mobile terminal.

6. A method, comprising:
   establishing communication between a mobile terminal and a database system via a telecommunications network;
   determining if the mobile terminal is subscribed to a secure identity feature;
   prompting for entry of an identifier at the mobile terminal, when the mobile terminal is subscribed to the secure identity feature;
   instructing, in response to entry of the identifier, the mobile terminal to perform a retinal scan and a facial image capture;
   sending the retinal scan and the facial image from the mobile terminal to the telecommunications network;
   comparing, in the telecommunications network, the received retinal scan to stored retinal scans to determine a match;
   uploading the facial image to the database system when the received retinal scan matches a stored retinal scan; and
   dropping the communication with the mobile terminal when the received retinal scan does not match any of the stored retinal scans;
   wherein the facial image is a passport photo, and wherein the passport photo and time stamped travel log information associated with the received retinal scan are downloaded from the database system when the received retinal scan matches a stored retinal scan.

7. The method according to claim 6, wherein the mobile terminal is a cell phone having a retinal scan module.

8. The method according to claim 6, wherein the mobile terminal is a cell phone having a camera module.

9. The method according to claim 6, wherein the facial image is stored in an image database in the database system.

10. The method according to claim 9, wherein the, image database is a passport database, and wherein the database system has an INS server operatively coupled to the image database.

11. The method according to claim 6, wherein the identifier is a PIN (personal identification number).

12. The method according to claim 6, wherein the telecommunications network has at least a mobile switching center operatively coupled to at least one base station and to at least one PSTN (public switched telephone network), wherein the PSTN is operatively coupled to the database system, and wherein the base station is wirelessly coupled to the mobile terminal.

13. A method, comprising:
   establishing communication between a mobile terminal and a database system via a telecommunications network;
   determining if the mobile terminal is subscribed to a secure identity feature;
   prompting for entry of an identifier at the mobile terminal, when the mobile terminal is subscribed to the secure identity feature;
   instructing, in response to entry of the identifier, the mobile terminal to perform a retinal scan;
   sending the retinal scan from the mobile terminal to the telecommunications network;
   comparing, in the telecommunications network, the received retinal scan to stored retinal scans to determine a match;

downloading a facial image associated with the received retinal scan from the database system when the received retinal scan matches a stored retinal scan; and dropping the communication with the mobile terminal when the received retinal scan does not match any of the stored retinal scans;

wherein the facial image is a passport photo, and wherein the passport photo and time stamped travel log information associated with the received retinal scan are downloaded from the database system when the received retinal scan matches a stored retinal scan.

14. The method according to claim 13, wherein the mobile terminal is a cell phone having a retinal scan module.

15. The method according to claim 13, wherein the passport photo and the time stamped travel log information are stored in an image database in the database system.

16. The method according to claim 15, wherein the image database is a passport database, and wherein the database system has an INS server operatively coupled to the image database.

17. The method according to claim 13, wherein the telecommunications network has at least a mobile switching center operatively coupled to at least one base station and to at least one PSTN (public switched telephone network), wherein the PSTN is operatively coupled to the database systems, and wherein the base station is wirelessly coupled to the mobile terminal.

18. The method according to claim 13, wherein the identifier is a PIN (personal identification number).

19. The method according to claim 13, wherein the passport photo and the time stamped travel log information are at least one of outputted in a hardcopy form as a passport or displayed at the mobile terminal as an electronic passport.

* * * * *